United States Patent [19]

Cooper

[11] 4,139,229
[45] Feb. 13, 1979

[54] ENCLOSURE EXTENSION FOR VEHICLE

[76] Inventor: Herbert Cooper, 1 Toms Pt. La., Port Washington, N.Y. 11050

[21] Appl. No.: 786,769

[22] Filed: Apr. 12, 1977

[51] Int. Cl.² ............................................. B60P 3/32
[52] U.S. Cl. .................................... 296/23 C; 296/26
[58] Field of Search ..................... 296/23 R, 23 C, 26, 296/27, 24 R

[56] References Cited

U.S. PATENT DOCUMENTS

| | | | |
|---|---|---|---|
| 3,650,556 | 3/1972 | Ratcliff | 296/23 C |
| 3,811,723 | 5/1974 | Anderson | 296/23 R |
| 3,923,336 | 12/1975 | Price | 296/23 R |
| 4,010,973 | 3/1977 | Heinrich | 296/23 R |

Primary Examiner—Richard A. Bertsch
Attorney, Agent, or Firm—Homer J. Bridger

[57] ABSTRACT

A vehicle whose interior is accessible from the outside through openable doors is provided with an enclosure extension formed with a support fixed on the vehicle in the vicinity of and generally above the aperture formed by the doors and generally within the vertical projection of the vehicle. A full-suspension frame is displaceable on the support between a retracted position generally within the support and an extended position extending from the support and from the vehicle above the aperture. A pair of side walls formed as hinged-together panels, a top wall, and a bottom wall are carried on the frame and displaceable therewith. The hinges between the panels allow the walls and the frame to move between a folded position corresponding to the retracted position of the frame with all the walls fitting compactly together and occupying a relatively small space and an unfolded position corresponding to the extended position of the frame and forming an empty compartment having a bottom constituted by the bottom wall, a pair of upright sides constituted by the top wall. Each of the walls has a frontal edge turned horizontally toward the vehicle and connectable tightly therewith by means of a magnetic seal. The rear edges of these walls are engaged with a downwardly swingable end wall that therefore forms with the other walls a five-sided space open on a sixth side into the vehicle and constituting an extension of its enclosure.

16 Claims, 6 Drawing Figures

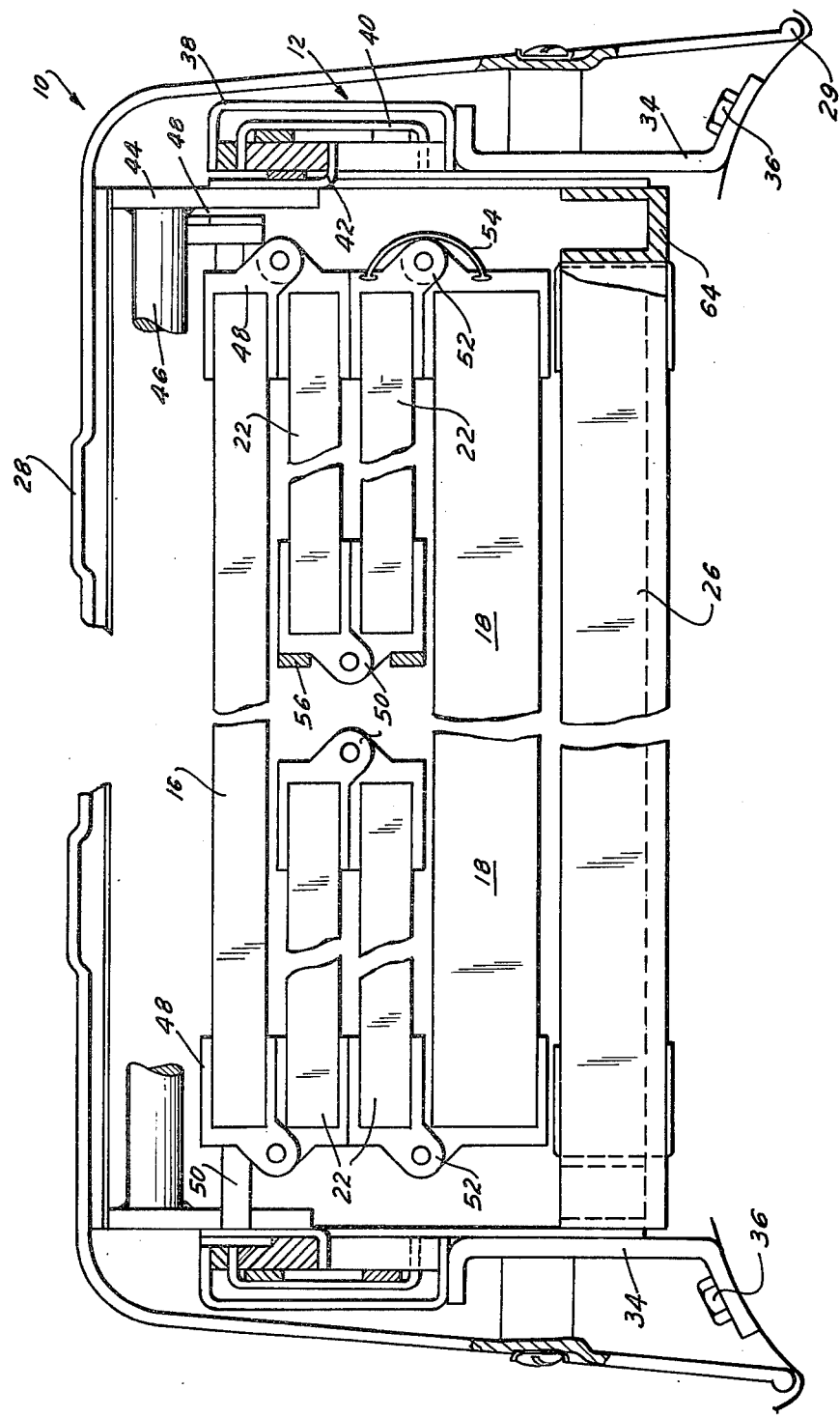

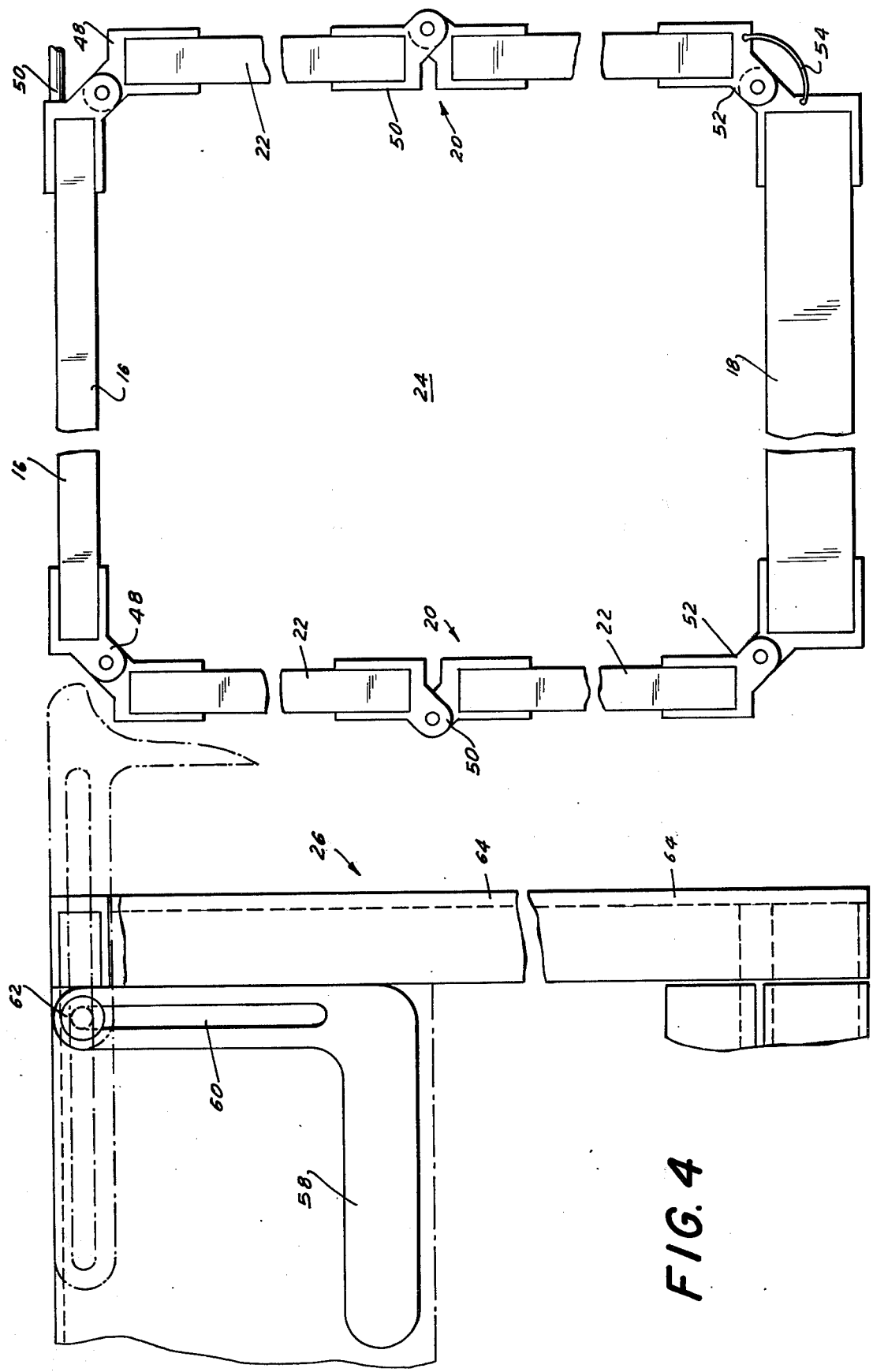

ENCLOSURE EXTENSION FOR VEHICLE

FIELD OF THE INVENTION

The present invention relates to an accessory for use with a vehicle. More particularly this invention concerns an extension providing additional enclosed space for a van or trailer-type or automotive vehicle.

BACKGROUND OF THE INVENTION

A difficulty with most vehicles, whether of the automotive van type or trailer type is that the interior space is extremely limited. Thus when used as recreational vehicles or campers the accommodations inside the camper must be arranged so that the equipment carried during travel can be compactly stowed to leave room and the kitchen and sleeping accommodations can be used when not on the road. In a van-type camper in particular such storage space is usually inadequate. After a day's travel the driver must transfer his or her equipment in order to free the bunks and the like in the rear for sleeping. Clearly this is a burdensome and time-consuming task, particularly as it must be done at the end of a long day's travel.

An accessory is known for a camper or van which comprises a unit that can sit on top of the vehicle and allow the living space inside it to be increased upwardly. The arrangement comprises in its simplest form an upwardly displaceable roof section normally sitting on top of a relatively large aperture in the vehicle roof. This roof section is carried on articulated arms and is connected at its edges to the edges of the aperture by accordion-type side walls. Thus the roof section can be raised so that it is possible to stand in the vehicle living space, or to use the increased area as a second-floor level.

This last-described arrangement requires extensive alterations to the vehicle on which it is used. Furthermore once installed the arrangement must remain on the vehicle at all times, as the alterations which must be made require permanent mounting of the extension. Furthermore the extension itself is quite expensive and its installation requires expert structural modification of the basic vehicle.

OBJECTS OF THE INVENTION

It is therefore an object of the present invention to provide a self-contained extension enclosure usable for increasing the enclosed space of the vehicle whether of the automotive van type or the trailer type recreation vehicle.

Another object is to provide such an accessory which does not require specialized personnel for its installation.

Yet another object is to provide an extension which can be easily mounted and removed from the camper when not in use, and which can be manufactured at relatively low cost.

A further object of this invention is to provide a camper extension which can quickly be arranged to greatly increase the enclosed space in a camper or recreational vehicle.

SUMMARY OF THE INVENTION

These objects are attained according to the present invention in an accessory for use with a vehicle having a closed interior accessible from the exterior through an aperture. The accessory in accordance with this invention has a support which is fixed on the vehicle in the vicinity of and generally above the aperture and generally within the vertical projection of the vehicle. A frame is displaceable on this support between a retracted position generally within the support and an extended position projecting from the support and from the vehicle above the aperture. A top wall, a bottom wall, and at least two side walls are all carried on the frame and displaceable therewith. Articulations are provided between these walls and frame for displacing the walls from a folded position corresponding to the retracted position of the frame with all of the walls fitting compactly together and occupying a relatively small space, and an unfolded position corresponding to the extended position. In this unfolded position these walls form an empty compartment having a bottom constituted by the bottom wall, the upright sides constituted by the side walls, and a top constituted by the top wall. Each of these walls has a front edge turned horizontally toward the vehicle in the extended and unfolded positions and a rear edge turned horizontally away from the vehicle in the folded positions. All of these front edges can be tightly sealed to the vehicle around the aperture in the unfolded and extended positions so that the additional living space forms a snug extension of the interior space of the vehicle. An end wall is carried on the frame and is displaceable thereon between an up position corresponding to and fitting closely with the other walls in the folded position of these walls, and a down position extending uprightly and snugly engaging the rear edges of the other walls in the unfolded position thereof.

Thus in accordance with the present invention the frame with the folded walls is pulled out from the support which is mounted either inside or outside the vehicle directly under the roof, or on top of the vehicle or on the interior or exterior sides thereof. These walls are all then unfolded so as to form a five-sided space, open at its sixth side directly into the vehicle. In this manner it is possible very rapidly to add considerable living space to the vehicle, so that the relatively cramped quarters normally provided by such a vehicle are greatly expanded. The use of such an extension has the considerable advantage that it is possible to use the additional space provided by this extension as the living space, allowing the interior of the vehicle to be arranged purely for other functions. Thus the bunks and the like that are normally provided inside the vehicle need not be so provided. They may be included within the walls of the enclosure of this invention. Once the extension is set up it is a very simple matter to position the matresses, or the like on such included bunk structure in the enclosure extension for sleeping therein. The interior space of the vehicle can then be reserved permanently for eating and storage. In this manner it is not necessary to transpose the various camping gear normally carried in such a vehicle in order to provide space for sleeping accommodations.

According to further features of this invention the top wall and bottom wall are formed as rigid slabs or plates. The side walls, however, are each formed of at least two sections connected at horizontal hinges to each other and to the top and bottom walls. Thus when the bottom wall is pulled down away from the top wall the various sections of the side walls, which in the folded position extended parallel and one directly above the other, fold down into a single straight planar side wall rigidly interconnecting the top and bottom walls.

The rear end wall maybe a single plate or slab which is swung out on its own hinge prior to pulling-down of the bottom wall with concomitant unfolding of the side walls. However, the rear end wall may also be hinged as with the side walls.

According to yet another feature of this invention the frame is of the slide, full-suspension type. This allows the folded enclosure and its frame to be pulled completely free from the enclosure storage support or pod on top of the vehicle so that the entire arrangement can be slid completely out of this pod which is on top of the vehicle for erection of the enclosure by pulling-down of the various walls. Such a full-suspension frame is, in accordance with the present invention, comprised of at least three telescoping or mutually sliding or rolling members, one of which is fixed on the vehicle, one of which moves with the side walls, and a third one which extends between the other two and serves to support the outermost member when it is completely extended. Torsion bars may be used to counterbalance the various elements so that very little force need be exerted to fold and unfold the walls to erect or collapse the unit for storage during transport.

In accordance with a further feature of this invention adjustable legs are provided at the end of the walls remote from the vehicle. These legs are brought down firmly into contact with the ground once the extension is erected so that the floor is rigidly supported.

According to yet another feature of this invention the front edges of the erected walls adjacent the vehicle and shaped so as to fit snugly against the vehicle around the aperture. This edge is provided with a flexible magnetic seal so that the interior of the vehicle can be heated or cooled without air leakage at the seam between the extension and the vehicle interior. It is also possible to use a soft sponge-type seal, a velour seal, or the like.

The arrangement according to the present invention can preferably be formed as a separate pod that is mounted on top of the vehicle. The full-suspension frame pulls out the rear end, relative to the normal forward direction of travel from the pod mounted on top of the van so that this extension when in use will fit against the aperture constituted by the rear doors of the vehicle. Provision of such an arrangement requires no major alterations of the van. Indeed the device need merely be releasably secured to the top of the van via suitable fittings which can be fastened to the vehicle roof by means of pop rivets, self-tapping screws, or the like. It is possible to mount the pod or support in accordance with this invention in a removable manner so that a van which is used most of the year, for example, for commercial purposes can be fitted with the extension accessory for vacation times only. This greatly reduces wear-and-tear on the extension accessory, and eliminates transport of the accessory when it is not needed, this provides major fuel economies. It is possible to transfer this pod-enclosed enclosure accessory from van to van if desired.

BRIEF DESCRIPTION OF THE DRAWING

FIG. 3 is a vertical section through the accessory according to this invention in the retracted and folded-up position;

FIG. 4 is a vertical and longitudinal section through a detail of the accessory according to this invention;

FIG. 6 is a rear end view showing the top, side, and bottom walls of this invention in the folded-down position.

SPECIFIC DESCRIPTION

Figure 1:
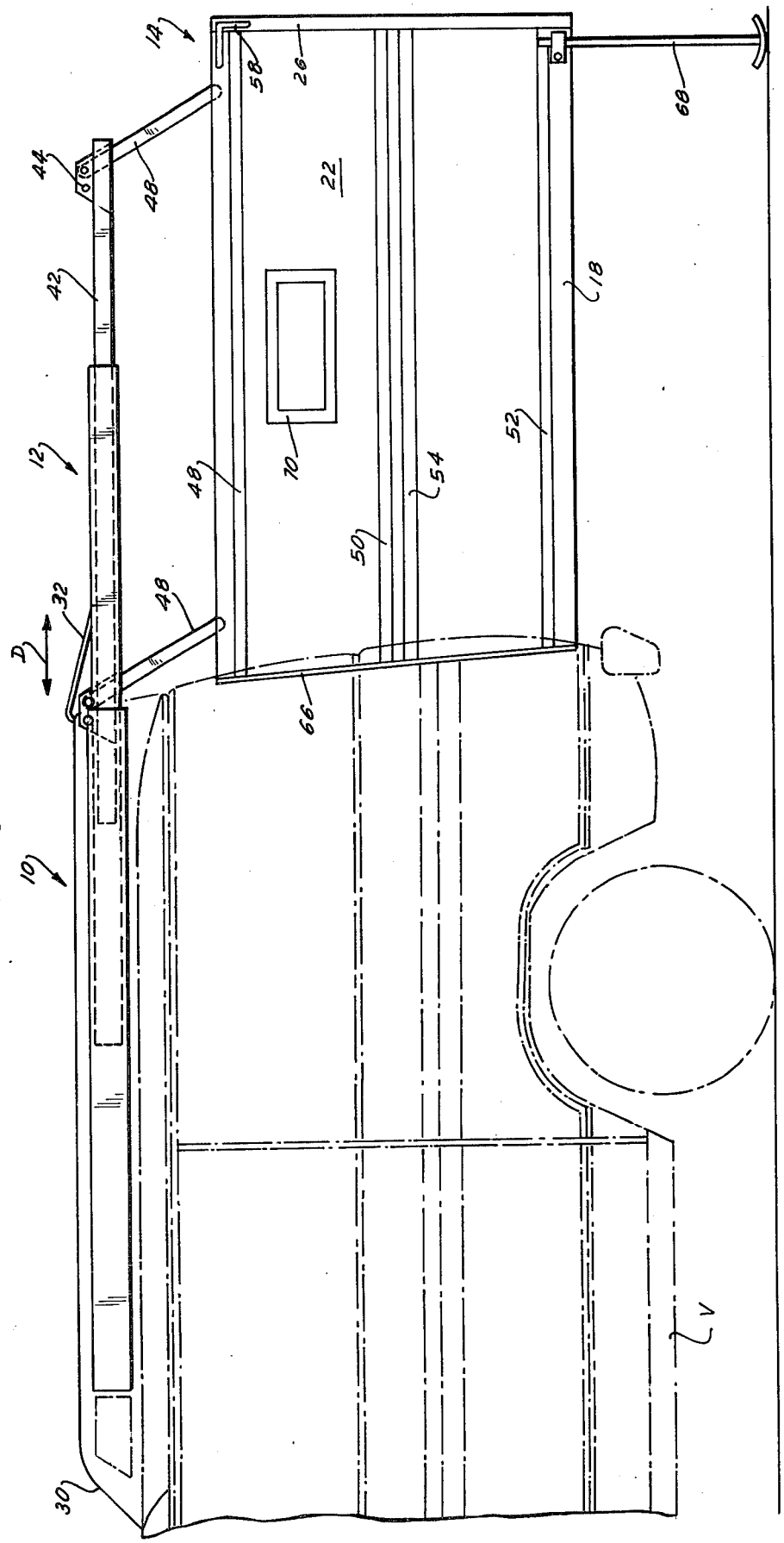
FIG. 1 is a side view of the enclosure accessory according to the invention shown in the use position on the back of a van.
Figure 2:
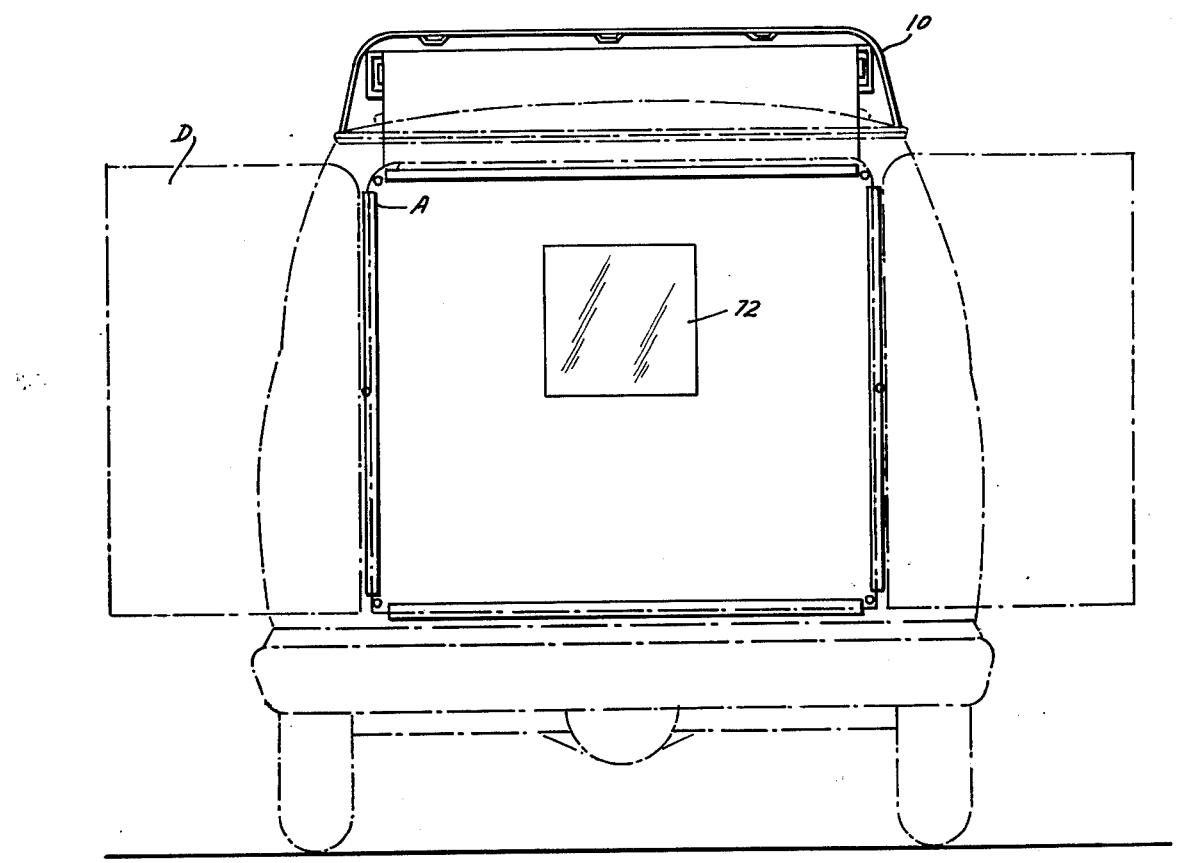
FIG. 2 is a rear view of the arrangement shown in FIG. 1.

As shown in FIG. 1 a system according to this invention basically comprises an enclosure support or pod 10 shaped to be mounted and to fit snugly against the roof of a van V. A full-suspension frame 12 is slidable in the direction of arrow D into this support 10 and carries a plurality of walls forming an extension enclosure 14 adapted to fit against the rear of the vehicle or van V at the aperture A left when the doors D of the van are opened as shown in FIG. 2. The extension closure is basically formed by a top wall 16, a bottom wall 18 parallel thereto, and a pair of side walls 20 each constituted by two side-wall sections 22. The elements 16, 18, and 22 are all formed as rigid planar panels. The floor panel 18 is thicker than the other panels 16 and 22 to support the weight of the occupants within the space 24 defined by the walls 16, 18, and 22 in the folded-down position show in FIG. 6. These panels 16, 18, and 22 can be a sandwich of polyurethane foam or insulation between a pair of rigid aluminum sheets. Such a combination gives considerable strength and good insulation properties while being of relatively low weight. In addition as shown in part in FIG. 4, a rear-wall panel 26 of the same construction as the panels 16, 18, and 22 closes the rear of the square 24.

The support or pod 10 basically comprises as shown in FIG. 3 a downwardly open U-shaped shell 28 whose lowermost edges 29 fit into the rain gutter of the van V. At the front end, the shell 28 is closed as shown at 30 and snugly fits the top of the van V, with seals provided at the joint to prevent water from entering between the shell 28 at the portion 30 and the van V. At its rear end, the shell 28 is provided with an upwardly swingable door 32 which is normally held closed by key-operated latches so as tightly and securely to hold the frame 12 and walls forming the compartment 14 inside the shell 28. This rear door swings up and lies on top of the full-suspension frame 12 when the arrangement is opened. Best shown in FIG. 3, the shell 28 is provided with a pair of longitudinally extending parallel beams 44 which are bolted securely at 36 to the frame to hold the entire pod 10 firmly on the roof of the van V.

The frame 12 comprises a pair of telescoping beams formed by a relatively large front beam 38 which are easily secured permanently to a respective one of the beams 34. Slidable within each of these front beams 38 is an intermediate beam 40 and slidable within each of these intermediate beams 40 is a rear beam or section 42. Rollers are provided between these various telescoping members 38, 40, and 42 and stops prevent any of them from pulling completely out and separating from any of the other telescoping elements.

Figure 5:
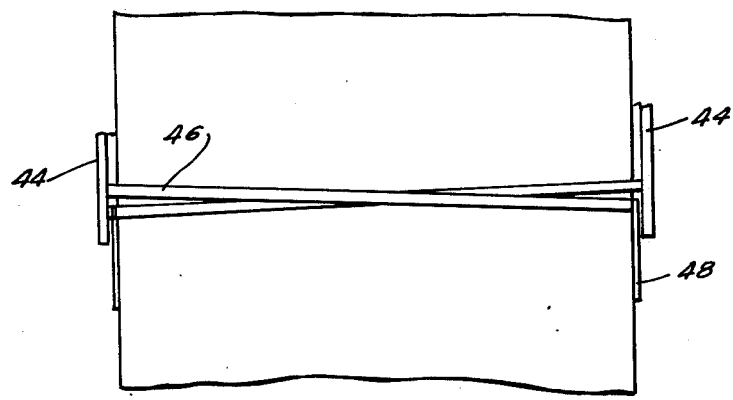
FIG. 5 is a top view of detail of the accessory according to the invention.

Each member 42 carries a pair of longitudinally spaced cleats 44 formed with a pair of relatively close but longitudinally spaced holes in the front, one of which is fixed to one end of a torsion bar 46 whose other end is journaled in the rear hole of the other cleat or flange 44 and rotatably fixed to an arm 48. The lower end of each of these arms 48 is connected via a pin 50 to a respective location along the roof panel 16. This is illustrated in FIG. 5. The torsion bars 46 are so stressed that the free ends of the arms 48 are biased upwardly with a force approximately equal to the weight of the wall assembly 14.

The uppermost panel 22 of each of the sides 20 is connected via a hinge 48, defining a longitudinal pivot axis, to the respective edge of the roof panel 16. This hinge 48 is formed as a pair of U-shaped sections, each embracing a respective edge of a respective one of the panels, and a piano-hinge coupling between them. Each such hinge 48 is spring loaded in such a manner as to urge the panels 16 and 22 into the indicated folded-up position of FIG. 3. An identical such hinge 50 connects each of the upper panels 22 to the respective lower panel and another such hinge 52 which differs only from the hinges 48 and 50 in that one of the U-shaped members is substantially larger than the other, connect the lower edge of each of the lowermost panels 22 to the respective edge of the floor panel 18. All of these hinges are spring loaded to bias the arrangement into the folded-up position of FIG. 3. In addition a flexible strip or seal 54 is provided over each of these hinges 48, 50, and 52 to protect the pivot and spring and ensure an airtight and watertight joint at the hinge. The abutting surfaces of the hinges are provided as shown at 56 with elastomeric seals and bumpers to make the assembly as draft and rain-free as possible and to prevent relative motion of the parts in the folded-down position of FIG. 6.

The rear wall panel 26, which is formed as an outer frame surrounding an inner swing-out panel, is carried on a pair of L-shaped brackets 58 having one leg riveted to the edge of the panel 56 and another leg formed with an elongated slot 60 through which passes a pin 62 extending horizontally from the respective edge of the end of the roof panel 16. This slot 60 is elongated so that when the pin 62 is in the front end of the slot 60, the panel 26 can pivot as shown in FIG. 4 between an upright position spaced well behind the assembly 14 in the unfolded position and an up position in which as shown in FIG. 3 the panel 26 underlies the assembly 14 in the folded position. When the pin 62 is in the rear end of the slot 60, the panel 26 fits snugly against the rear edges of the panels as shown in FIG. 1. In addition the panel 26, which has a horizontal dimension substantially equal to that of the panels 16 and 18, is provided on each of its vertical edges with a U-section channel 64 which faces forwardly in the down position of the rear wall 26. Each of the channels 64 has a dimension between its two flanges which allows the rear edges of the corresponding two panels 22 to fit within it. To this end the hinges 48, 50, and 52 on the side walls 20 terminate a short distance before the rear edges of the respective panels. Thus once the assembly 14 is unfolded the rear wall 26 can be pushed forward so that the channels 64 will embrace and rigidly lock together the rear edges of the panels 22. This makes the entire assembly extremely rigid. Simple latches between the upper and lower sides of the panel 26 and the upper and lower walls 16 and 18, respectively, therefore ensure that the five-sided space 24 defined by the top wall 16, side walls 20, bottom wall 18, and end wall 26 is very rigid.

At their front edges the panels 16, 22, and 18 are shaped so as to fit snugly around the aperture A defined in the van V when the doors D are open. In addition this front edge is provided with the flexible seal 66 of the magnetic type used on refrigerator doors so as to form an extremely tight joint between the horizontally forwardly facing front edges of the panels 22, 16, and 18, and the body of the van V. Jacks 68 are provided connected to the floor panel 18 adjacent the rear end thereof to support the rear end thereof to support the rear end of the extension. The uppermost panel 22 on each side is provided with a window 70 and a door or window 72 can be provided in the rear panel 26. Sliding transparent panels and screens may be provided on these windows 70 and 72 for ventilation of the interior space 24.

With the system according to the present invention, the entire assembly is folded and slid into the shell 28 of the support 10 when the vehicle V is on the road. When the assembly is to be used the door 32 is swung up, normally after unlocking the key-latches at the corners that not only hold this door securely shut and prevent tampering with the structure, but also prevent the assembly from sliding out during the rapid starting or maneuvering of the vehicle V.

Once the door 32 has been opened, the user, as this device can be set up easily by one person, need merely grasp any of the panels 16, 22, 18, or 26. Normally the rear panel 26 is grasped and the entire assembly is slid out of the shell 28 in the folded position, with the intermediate member 40 extending halfway out of the front member 38 and the rear member 42 extending halfway out of the intermediate member 40 and almost fully out of the front member 38. The rear panel 26 is then pivoted down into a vertical or upright position. This is normally facilitated by providing a catch or clip which secures the lowermost or frontmost edge of the panel 26 to the underside of the panel 18 in the folded position so that upon folding of this rear panel 26 it locks the entire assembly 14 into the storage or travel position.

Once the rear panel 26 is in the vertical position the user need merely pull the floor panel 18 downward away from the roof panel 16 until the two panels 22 stand vertically in line with one another. The rear panel 26 is then pushed forward so that the pins 62 come to rest in the rear end of the slots 60. This fits the channels 64 over the rear ends of the panels 22 and locks the entire assembly into the open position. Clips or latches at the top and bottom of the rear panel 26 may then be secured to prevent the assembly from refolding.

Normally such unfolding of the arrangement pivots the arms 48 down against their torsion bars 46. The entire assembly is then pushed forward to seat the seal 66 tightly against the rear of the vehicle around the aperture A and, once again, some clips may be secured to hold the vehicle and the enclosure together in this position. The jacks 68 are then fitted to appropriate clips on the floor panel 18 and adjusted to tight and level engagement relation to the ground.

The interior space thus formed is suited for use as a sleeping enclosure on camping trips. Thus it is possible for the interior of the vehicle V (a van or trailer) to be devoted solely to storage and other purposes, as bunks and the like need not be provided herein, since the such can be built into the sides of the enclosure or the users can readily position air mattresses and sleeping bags in the inside space 24 and use it for sleeping. Design and layout of the interior of the van V is greatly simplified since sleeping accommodations do not have to be provided in the van V. Of course it is possible to use such an assembly in a standard van having sleeping accommodations, and employ the storage space 24 for further private children's sleeping accommodations or other purposes.

Although the assembly has been described above for use on top of a standard truck or van, it is of course possible to use it in combination with a station wagon, trailer-type camper, or virtually any other type vehicle. Furthermore the support 10 need not be provided on top of the van but could be provided inside the vehicle directly under the roof thereof so that the assembly is pulled out of the open aperture A. It is also possible to provide this assembly on the side of a vehicle so as to fit with laterally opening doors D. In addition the rigid panels 22 can be dispensed with and roll-down side walls can be employed as shown in my U.S. Pat. No. 3,941,415.

Furthermore the pod or support 10 may be mounted below the floor of the vehicle body and the assembly can slide out therefrom for upward unfolding to provide a suitable enclosure. The torsion rod assembly greatly assists in the folding and unfolding operation from such a position.

The assembly or at least the support 10 could furthermore be mounted on top of a set of arms allowing it tp ne raised up or down relative to the vehicle in order to provide the extra living enclosure 24 at a different level. All such modifications are intended to lie within the scope of this invention.

I claim:

1. An accessory for use with a vehicle having a closed interior accessible from the exterior through an aperture, said accessory comprising:
   a support fixed on said vehicle in the vicinity of and generally above said aperture and generally within the vertical projection of said vehicle;
   a frame displaceable on on said support between a retracted position generally within said support and an extended position projecting from said support and from said vehicle above said aperture;
   a top wall, a bottom wall, and a pair of side walls all carried on said frame and displaceable therewith;
   means including articulations between said walls and said frame for displacing same from a folded position corresponding to said retracted position with all of said walls fitting compactly together and occupying a relatively small space and an unfolded position corresponding to said extended position and forming an empty compartment having a bottom constituted by said bottom wall, a pair of upright sides constituted by said side walls, and a top constituted by said top wall, each of said walls having one edge turned horizontally toward said vehicle in said extended and unfolded positions and another opposite edge turned horizontally away from said vehicle in said extended and unfolded positions;
   means for securing said one edge tightly to said vehicle around said aperture in said unfolded and extended positions;
   means for spring biasing said walls into said folded position; and
   an end wall carried on said frame and displaceable between an up position corresponding to and fitting closely with the other walls in said folded position and a down position extending uprightly and snugly engaging said other edges of said other walls in said unfolded position thereof.

2. The accessory defined in claim 1 wherein each of said walls includes at least one generally rectangular and rigid panel.

3. The accessory defined in claim 2 wherein each of said side walls includes a pair of such panels lying in substantially the same vertical plane in said folded-down position and lying parallel to each other in said folded-up position.

4. The accessory defined in claim 1 wherein said articulations are horizontally extending hinges.

5. The accessory defined in claim 1 wherein said frame is of the full-suspension type extending completely out of said support in said extended position.

6. The accessory defined in claim 5 wherein said frame includes a suspension having at least three members including a front member slidable on said support, an intermediate member slidable on said front member, and a rear member slidable on said intermediate member and carrying said walls.

7. The accessory defined in claim 1 wherein said frame is provided with arms carrying said walls and pivotal down from said frame in said folded-out position of said walls.

8. The accessory defined in claim 7 wherein said arms are pivotal about respective horizontal axes on said frame, said accessory further including spring means urging said arms into a position with said top wall close to said frame.

9. The accessory defined in claim 8 wherein said spring means include torsion bars on said frame connected to said arms.

10. The accessory defined in claim 1 wherein said rear wall is a rigid panel having in said folded-down position a pair of vertical edges each provided with a channel fitting over said side walls and preventing displacement of same into said folded-up position.

11. The accessory defined in claim 1 wherein said rear wall is pivotal on said frame about an axis generally perpendicular to the planes of said side walls in said folded-out position and is limitedly displaceable toward and away from said other edges.

12. The accessory defined in claim 11 wherein in said folded-up position said rear wall lies parallel to and under said other walls.

13. The accessory defined in claim 1, further comprising means for securing said one edge to said vehicle at said aperture.

14. The accessory defined in claim 13 wherein said means for securing includes a strip-type magnetic seal.

15. The accessory defined in claim 1, further comprising means for supporting said walls in said walls in said folded-down generally at said rear walls on the ground.

16. The accessory defined in claim 1 wherein said support is a shell fitted to and carried atop said vehicle, said walls and frame being completely enclosed in said shell in said retracted and folded-up positions.

* * * * *